US006941222B2

(12) United States Patent
Yano et al.

(10) Patent No.: US 6,941,222 B2
(45) Date of Patent: Sep. 6, 2005

(54) NAVIGATION SYSTEM, SERVER SYSTEM FOR A NAVIGATION SYSTEM, AND COMPUTER-READABLE INFORMATION RECORDED MEDIUM IN WHICH DESTINATION PREDICTION PROGRAM IS RECORDED

(75) Inventors: Kenichiro Yano, Tsurugashima (JP); Kiyonori Myochin, Tokyo-to (JP); Keiichi Yamauchi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 73 days.

(21) Appl. No.: 10/132,570

(22) Filed: Apr. 26, 2002

(65) Prior Publication Data

US 2002/0161517 A1 Oct. 31, 2002

(30) Foreign Application Priority Data

Apr. 27, 2001 (JP) ..................................... P2001-132896

(51) Int. Cl.[7] .......................... G01C 21/26; G01C 21/30
(52) U.S. Cl. .................... 701/209; 701/202; 340/995.1; 340/995.17; 340/995.18; 342/359
(58) Field of Search ................................. 701/202, 207, 701/209, 210, 213, 208, 211, 216; 340/995.14, 990, 995.1, 995.17, 995.18, 995.23, 995, 988; 455/456.1, 441; 342/359, 357.06, 357.13

(56) References Cited

U.S. PATENT DOCUMENTS

| | | | | |
|---|---|---|---|---|
| 5,897,602 A | * | 4/1999 | Mizuta ........................ | 701/201 |
| 5,902,349 A | * | 5/1999 | Endo et al. .................. | 701/202 |
| 5,912,635 A | * | 6/1999 | Oshizawa et al. ........... | 340/988 |
| 5,991,688 A | * | 11/1999 | Fukushima et al. .......... | 701/209 |
| 6,188,956 B1 | * | 2/2001 | Walters ....................... | 701/200 |
| 6,212,472 B1 | * | 4/2001 | Nonaka et al. .............. | 701/208 |
| 6,249,740 B1 | * | 6/2001 | Ito et al. ..................... | 701/200 |
| 6,263,276 B1 | * | 7/2001 | Yokoyama et al. .......... | 701/207 |
| 6,282,492 B1 | * | 8/2001 | Gorai et al. ................. | 701/209 |
| 6,285,950 B1 | * | 9/2001 | Tanimoto .................... | 701/201 |
| 6,314,369 B1 | * | 11/2001 | Ito et al. ..................... | 701/209 |
| 6,330,453 B1 | * | 12/2001 | Suzuki et al. ............... | 455/456 |
| 6,360,167 B1 | * | 3/2002 | Millington et al. .......... | 701/211 |
| 2001/0007089 A1 | * | 7/2001 | Takeuchi .................... | 701/211 |
| 2001/0027375 A1 | * | 10/2001 | Machida et al. ............ | 701/209 |
| 2001/0053956 A1 | * | 12/2001 | Ohishi et al. ............... | 701/209 |

FOREIGN PATENT DOCUMENTS

JP 07004977 A * 1/1995 ........... G01C/21/00

* cited by examiner

*Primary Examiner*—Thomas G. Black
*Assistant Examiner*—Tuan C To
(74) *Attorney, Agent, or Firm*—Sughrue Mion, PLLC

(57) ABSTRACT

A navigation system is provided that allows an appropriate destination point to be set when a vehicle begins to travel without an operator setting a destination point. A navigation system is provided with a system control section and, if a vehicle begins to travel without an operator setting a destination point, destination point information is retrieved. This destination point information is stored in a travel information database on the basis of information about the position of the vehicle, the direction in which the vehicle is progressing and information about the road. The road is which the vehicle is traveling along that was calculated based on the respective signals input from a GPS receiving section and various sensor sections. In addition, if there are candidates for the relevant destination point, candidate destination points are displayed on a display section as predicted destination points.

31 Claims, 4 Drawing Sheets

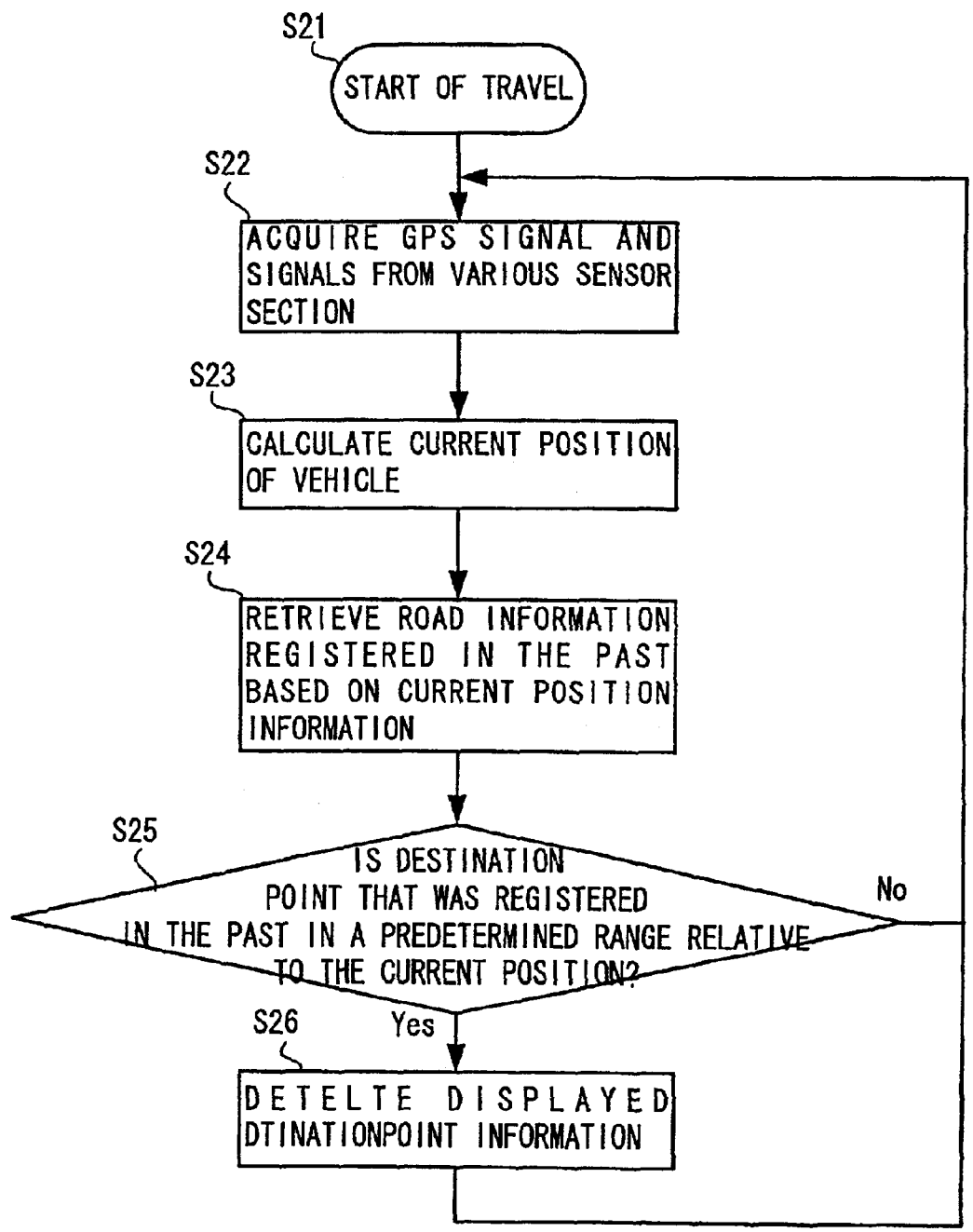

US 6,941,222 B2

NAVIGATION SYSTEM, SERVER SYSTEM FOR A NAVIGATION SYSTEM, AND COMPUTER-READABLE INFORMATION RECORDED MEDIUM IN WHICH DESTINATION PREDICTION PROGRAM IS RECORDED

BACKGROUND OF THE INVENTION

1. Field of the Invention

The present invention relates to a technical field regarding navigation systems, and particularly, to navigation systems that guide a movable body towards a set destination.

2. Description of the Related Art

In recent years, navigation systems mounted in a vehicle for guiding the movement of the vehicle by displaying a map on a display such as a liquid crystal display panel mounted in the vehicle has become extremely common.

In these in-vehicle navigation systems, when a travel route to a destination is retrieved, the geographical point of the destination (referred to below simply as the destination point) needs to be set in advance before the trip, and this setting of the destination point is done using an operation section such as a remote control or the like.

For example, methods that are employed include a method in which the setting is based on the name of a town or region, a method in which the setting is based on a telephone number, and a method in which the setting is selected a geographical point from geographical points that have been previously registered.

However, if no destination point is set, it is not possible for a navigation system to plan a route to a destination point by retrieving travel routes, and particularly, to plan a route to a destination point by retrieving travel routes while also taking into consideration information from, for example, a vehicle information and communication system (referred to below simply as VICS). Therefore, when a conventional navigation system is used, it is necessary for a destination point to be set using an operation section such as a remote control or the like, as is described above. As a result, there is a problem that the complicated operation for someone who is technically unskilled of setting a destination point in the navigation system has had to be executed. Moreover, it has been necessary to set a destination point in order to retrieve a travel route even when the trip is only for a short distance, and because this travel route needs to be set before the trip begins, there is a problem that if the trip has required the retrieval of a travel route, it has not been possible to begin the trip immediately.

SUMMARY OF THE INVENTION

The present invention has been made in view of the above problems, an object thereof is, therefore, to provide a navigation system in which it is possible to set a suitable destination point even when an operator begins traveling without first setting a destination point.

(1) The above object of present invention can be achieved by a navigation system of the present invention. The system is provided with:

a receiving device which receives current position information used for measuring a current position of a mobile body; a recognizing device which recognizes the current position of the mobile body based on the received current position information; a database which stores destination point information including at least one of position information about a position of a destination point that was set in the past and route information about a route along which the mobile body traveled up to a destination point that was set in the past; a predicting device which predicts a destination point towards which the mobile body is currently heading based on the recognized current position of the mobile body and the destination point information stored in the database; and a notifying device which gives notification of the destination point towards which the mobile body is currently heading that has been predicted by the predicting device.

According to the present invention, the predicting device predicts a destination point towards which the mobile body is currently heading based on the recognized current position of the mobile body and the destination point information including at least one of position information about a position of a destination point that was set in the past and route information about a route along which the mobile body traveled up to a destination point that was set in the past, and the notification device gives notification of the predicted destination point as a result of the prediction.

Accordingly, because it is possible for the predicting device to predict a destination point towards which the mobile body is currently heading based on the recognized current position of the mobile body and the destination point information, even if an operator does not set a destination point by operating the operation section or the like, a destination point can be set by selecting notified destination point information, and the setting of the destination point can be made easily without any complicated operation having to be performed.

(2) In one aspect of the present invention, the system is further provided with; when the predicting device determines a portion of the route indicated by the route information matches at least one of the recognized current position of the mobile body and a road which the recognized current position of the mobile body belong to, the predicting device predicts the destination point based on the route information indicating the determined route as the destination point towards which the mobile body is currently heading.

According to the present invention, when the predicting device determines a portion of the route indicated by the route information matches at least one of the recognized current position and a road which the recognized current position belong to, the predicting device predicts the destination point based on the route information indicating the determined route as the destination point towards which the mobile body is currently heading.

Accordingly, when a road which the recognized current position belong to or a current position of the mobile body is included the route along which the mobile body traveled up to a destination point that was set in the past, because it is possible for the predicting device to predict the destination point which the mobile body traveled along the route up to as the destination point towards which the mobile body is currently heading, even if an operator does not set a destination point by operating the operation section or the like, a destination point can be set by selecting notified destination point information, and the setting of the destination point can be made easily without any complicated operation having to be performed.

(3) In another aspect of the present invention, the system is further provided with; when the predicting device determines at least one a portion of the route indicated by the route information and the position of the destination point indicated by the position information is present within a predetermined range of at least one of the recognized current position of the mobile body and a road which the recognized current position of the mobile body belong to, the predicting device predicts the destination point based on at least one of the route information indicating the determined route and the position information indicating the determined position as the destination point towards which the mobile body is currently heading.

According to the present invention, when the predicting device determines at least one a portion of the route indicated by the route information and the position of the destination point indicated by the position information is present within a predetermined range of at least one of the recognized current position and a road which the recognized current position belong to, the predicting device predicts the destination point based on at least one of the route information indicating the determined route and the position information indicating the determined position as the destination point towards which the mobile body is currently heading.

Accordingly, when the route along which the mobile body traveled up to a destination point that was set in the past or the position of the destination point that was set in the past is present within a predetermined range of a road which the recognized current position belong to or a current position of the mobile body, because it is possible for the predicting device to predict the destination point which the mobile body traveled along the route up to or the destination point that was set in the past as the destination point towards which the mobile body is currently heading, even if an operator does not set a destination point by operating the operation section or the like, a destination point can be set by selecting notified destination point information, the setting of the destination point can be made easily without any complicated operation having to be performed.

(4) In further aspect of the present invention, the system is further provided with; predicting device acquires current route information about the mobile body is currently traveling based on the recognized current position of the mobile body, after the predicting device has predicted the destination point towards which the mobile body is currently heading, the predicting device makes a new prediction as to the destination point toward which the mobile body is currently heading based on the stored route information indicating the predicted destination point and the acquired current route information.

According to the present invention, after the predicting device has predicted the destination point towards which the mobile body is currently heading, the predicting device makes a new prediction as to the destination point toward which the mobile body is currently heading based on the stored route information indicating the predicted destination point and the acquired current route information.

Accordingly, because a new prediction can be made as to the destination point towards which the mobile body is currently heading based on the current route information acquired as the mobile body advances further, it is possible to narrow down the predicted destination points as the mobile body advances further, particularly when a plurality of destination points have been predicted, the predicted destination point information can be narrowed down as the mobile body moves.

(5) In further aspect of the present invention, the system is further provided with; when at least one of a direction in which the mobile body is traveling and road information about a road along which the mobile body is traveling is altered, the predicting device makes a new prediction as to the destination point towards which the mobile body is currently heading.

According to the present invention, when at least one of a direction in which the mobile body is traveling and road information about a road along which the mobile body is traveling is altered, the predicting device makes a new prediction as to the destination point towards which the mobile body is currently heading.

Accordingly, because a new prediction as to the destination point can be made when the direction in which the mobile body is traveling changes or when the road information about the road which the mobile body is traveling on changes such as when the road along which the mobile body is traveling changes, if the new prediction is made from among the destination points predicted in the previous prediction, the notified destination point information can be narrowed down as the mobile body moves.

(6) In further aspect of the present invention, the system is further provided with; the predicting device predicts the destination point present within a preset range relative to a direction in which the mobile body is traveling as the destination point towards which the mobile body is currently heading.

According to the present invention, the predicting device predicts the destination point present within a preset range relative to a direction in which the mobile body is traveling as the destination point towards which the mobile body is currently heading.

Accordingly, when a destination point is predicted based on the current position of the mobile body, the road which the recognized current position belong to, or the route information about a route along which the mobile body traveled up to a destination point that was set in the past, it is possible to narrow down the predicted destination points to those within a preset range relative to the direction in which the mobile body is traveling, and thereby increase the accuracy of the prediction.

(7) In further aspect of the present invention, the system is further provided with; the predicting device predicts the destination point towards which the mobile body is currently heading using additional information that includes at least information on a date and time when the mobile body is moving as a condition for the prediction.

According to the present invention, the predicting device predicts the destination point towards which the mobile body is currently heading using additional information that includes at least information on a date and time when the mobile body is moving as a condition for the prediction.

Accordingly, because the destination point towards which the mobile body is currently heading can be predicted based on additional information such as the date and time, it is possible to narrow down the predicted destination points which the mobile body is traveling, and thereby increase the accuracy of the prediction.

(8) In further aspect of the present invention, the system is further provided with; an input device which inputs prediction conditions when the predicting device predicts the destination point towards which the mobile body is currently heading, wherein the predicting device predicts the destination point towards which the mobile body is currently heading based on the prediction conditions input using the input device.

According to the present invention, an input device for inputting prediction conditions when the predicting device is predicting the destination point towards which the mobile body is currently heading, wherein the predicting device predicts the destination point towards which the mobile body is currently heading based on the prediction conditions input using the input device.

Accordingly, because an operator is able to set conditions for predicting a destination point, the destination point towards which the mobile body is heading can be predicted based on conditions desired by the operator.

(9) In further aspect of the present invention, the system is further provided with; a deciding device which decides that the destination point predicted by the predicting device is the destination point towards which the mobile body is heading, wherein after the destination point has been decided by the deciding device, the prediction processing by the predicting device to predict a destination point is ended.

According to the present invention, a deciding device for deciding that the destination point predicted by the predicting device is the destination point towards which the mobile body is heading, wherein after the destination point has been decided by the deciding device, the prediction processing by the predicting device to predict a destination point is ended.

Accordingly, the destination point prediction processing is ended when a predicted destination point is decided as the destination point towards which the mobile body is heading.

(10) The above object of present invention can be achieved by a server system for a navigation system of the present invention. The system is provided with: a receiving device which receives current position information about a current position of a terminal device mounted in a mobile body; a predicting device which predicts a destination point towards which the moving body is currently heading based on the current position information and destination point information including at least one of position information about a position of a destination point that was set in the past and route information about a route along which the mobile body traveled up to a destination point that was set in the past; and a transmitting device which transmits to the terminal device information about the destination point towards which the moving is currently heading predicted by the predicting device.

According to the present invention, a predicting device for predicting a destination point towards which the moving body is currently heading based on the current position information and destination point information including at least one of position information about a position of a destination point that was set in the past and route information about a route along which the mobile body traveled up to a destination point that was set in the past, and a transmitting device for transmitting to the terminal device information about the destination point towards which the moving is currently heading predicted by the predicting device.

Accordingly, because it is possible for the predicting device to predict a destination point towards which the mobile body is currently heading based on the recognized current position of the mobile body and the destination point information, even if an operator does not set a destination point by operating the operation section or the like, a destination point can be set by receiving and selecting the destination point information transmitted from the server, and the setting of the destination point can be made easily without any complicated operation having to be performed.

(11) In further aspect of the present invention, the system is further provided with; when the predicting device determines a portion of the route indicated by the route information matches at least one of the recognized current position of the mobile body and a road which the recognized current position of the mobile body belong to, the predicting device predicts the destination point based on the route information indicating the determined route as the destination point towards which the mobile body is currently heading.

According to the present invention, when the predicting device determines a portion of the route indicated by the route information matches at least one of the recognized current position and a road which the recognized current position belong to, the predicting device predicts the destination point based on the route information indicating the determined route as the destination point towards which the mobile body is currently heading.

Accordingly, when a current position of a mobile body transmitted from a terminal device of the moving body is included the route along which the mobile body traveled up to a destination point that was set in the past, because it is possible for the predicting device to predict the destination point which the mobile body traveled along the route up to as the destination point towards which the mobile body is currently heading, even if an operator does not set a destination point by operating the operation section or the like, a destination point can be set by receiving and selecting the destination point information transmitted from the server, and the setting of the destination point can be made easily without any complicated operation having to be performed.

(12) In further aspect of the present invention, the system is further provided with; when the predicting device determines at least one of the route indicated by the route information and the position of the destination point indicated by the position information is present within a predetermined range of at least one of the recognized current position of the mobile body and a road which the recognized current position of the mobile body belong to, the predicting device predicts the destination point based on at least one of the route information indicating the determined route and the position information indicating the determined position as the destination point towards which the mobile body is currently heading.

According to the present invention, when the predicting device determines at least one a portion of the route indicated by the route information and the position of the destination point indicated by the position information is present within a predetermined range of at least one of the recognized current position and a road which the recognized current position belong to, the predicting device predicts the destination point based on at least one of the route information indicating the determined route and the position information indicating the determined position as the destination point towards which the mobile body is currently heading.

Accordingly, when the route along which the mobile body traveled up to a destination point that was set in the past or the position of the destination point that was set in the past is present within a predetermined range of a road which the recognized current position belong to or a current position of the mobile body, because it is possible for the predicting device to predict the destination point which the mobile body traveled along the route up to or the destination point that was set in the past as the destination point towards which the mobile body is currently heading, even if an operator does not set a destination point by operating the operation section or the like, a destination point can be set by receiving and selecting the destination point information transmitted from the server, and the setting of the destination point can be made easily without any complicated operation having to be performed.

(13) In further aspect of the present invention, the system is further provided with; predicting device acquires current route information about the mobile body is currently traveling based on the recognized current position of the mobile body, after the predicting device has predicted the destination point towards which the mobile body is currently heading, the predicting device makes a new prediction as to the destination point toward which the mobile body is currently heading based on the stored route information indicating the predicted destination point and the acquired current route information.

According to the present invention, after the predicting device has predicted the destination point towards which the mobile body is currently heading, the predicting device makes a new prediction as to the destination point toward which the mobile body is currently heading based on the stored route information indicating the predicted destination point and the acquired current route information.

Accordingly, because a new prediction can be made as to the destination point towards which the mobile body is currently heading based on the current route information acquired as the mobile body advances further, it is possible to narrow down the predicted destination points as the mobile body advances further, particularly when a plurality of destination points have been predicted, the predicted destination point information can be narrowed down as the mobile body moves.

(14) In further aspect of the present invention, the system is further provided with; when at least one of a direction in which the mobile body is traveling and road information about a road along which the mobile body is traveling is altered, the predicting device makes a new prediction as to the destination point towards which the mobile body is currently heading.

According to the present invention, when at least one of a direction in which the mobile body is traveling and road information about a road along which the mobile body is traveling is altered, the predicting device makes a new prediction as to the destination point towards which the mobile body is currently heading.

Accordingly, because a new prediction as to the destination point can be made when the direction in which the mobile body is traveling changes or when the road information about the road which the mobile body is traveling on changes such as when the road along which the mobile body is traveling changes, if the new prediction is made from among the destination points predicted in the previous prediction, the notified destination point information can be narrowed down as the mobile body moves.

(15) In further aspect of the present invention, the system is further provided with; the predicting device predicts the destination point present within a preset range relative to a direction in which the mobile body is traveling as the destination point towards which the mobile body is currently heading.

According to the present invention, the predicting device predicts the destination point present within a preset range relative to a direction in which the mobile body is traveling as the destination point towards which the mobile body is currently heading.

Accordingly, when a destination point is predicted based on the current position of the mobile body, the road which the recognized current position belong to, or the route information about a route along which the mobile body traveled up to a destination point that was set in the past, it is possible to narrow down the predicted destination points to those within a preset range relative to the direction in which the mobile body is traveling, and thereby increase the accuracy of the prediction.

(16) In further aspect of the present invention, the system is further provided with; the predicting device predicts the destination point towards which the mobile body is currently heading using additional information that includes at least information on a date and time when the mobile body is moving as a condition for the prediction.

According to the present invention, the predicting device predicts the destination point towards which the mobile body is currently heading using additional information that includes at least information on a date and time when the mobile body is moving as a condition for the prediction.

Accordingly, because the destination point towards which the mobile body is currently heading can be predicted based on additional information such as the date and time, it is possible to narrow down the predicted destination points which the mobile body is traveling, and thereby increase the accuracy of the prediction.

(17) In further aspect of the present invention, the system is further provided with; the receiving device receives notification that prediction conditions for predicting the destination point towards which the mobile body is currently heading have been input into the terminal device, and the predicting device predicts the destination point towards which the mobile body is currently heading based on the received prediction conditions.

According to the present invention, the receiving device for receiving notification that prediction conditions for predicting the destination point towards which the mobile body is currently heading have been input into the terminal device, the predicting device predicts the destination point towards which the mobile body is currently heading based on the received prediction conditions.

Accordingly, because an operator is able to set conditions for predicting a destination point, the destination point towards which the mobile body is heading can be predicted based on conditions desired by the operator.

(18) In further aspect of the present invention, the system is further provided with; the predicting device puts an end to predict the destination point when the receiving device receives notification that the destination point has been decided by the terminal device.

According to the present invention, the predicting device puts an end to predict the destination point when the receiving device receives notification that the destination point has been decided by the terminal device.

Accordingly, the destination point prediction processing is ended when a predicted destination point is decided as the destination point towards which the mobile body is heading.

(19) The above object of present invention can be achieved by an information recorded medium of the present invention wherein a destination point prediction program is recorded so as to be read by a computer, the computer included in a navigation system for navigating a mobile body. The destination point prediction program causes the computer to function as: An information recorded medium wherein a destination point prediction program is recorded so as to be read by a computer, the computer included in a navigation system for navigating a mobile body, the program causing the computer to function as: a predicting device which predicts a destination point information towards which the mobile body is currently heading based on a recognized current position of the mobile body and destination point information including at least one of position information about a position of a destination point that was set in the past and route information about a route along which the mobile body traveled up to a destination point that was set in the past; and a notifying device which gives notification of the destination point towards which the mobile body is currently heading that has been predicted by the predicting device.

According to the present invention, the computer predicts a destination point towards which the mobile body is currently heading based on the recognized current position of the mobile body and the destination point information including at least one of position information about a position of a destination point that was set in the past and route information about a route along which the mobile body traveled up to a destination point that was set in the past, and the computer gives notification of the predicted destination point as a result of the prediction.

Accordingly, because it is possible for the computer to predict a destination point towards which the mobile body is currently heading based on the recognized current position of the mobile body and the destination point information, even if an operator does not set a destination point by operating the operation section or the like, a destination point can be set by selecting notified destination point information, and the setting of the destination point can be made easily without any complicated operation having to be performed.

(20) In one aspect of the present invention, the destination point prediction program causes the computer to function as: when the predicting device determines a portion of the route indicated by the route information matches at least one of the recognized current position of the mobile body and a road which the recognized current position of the mobile body belong to, the predicting device predicts the destination point based on the route information indicating the determined route as the destination point towards which the mobile body is currently heading.

According to the present invention, when the computer determines a portion of the route indicated by the route information matches at least one of the recognized current position and a road which the recognized current position belong to, the computer predicts the destination point based on the route information indicating the determined route as the destination point towards which the mobile body is currently heading.

Accordingly, when a road which the recognized current position belong to or a current position of the mobile body is included the route along which the mobile body traveled up to a destination point that was set in the past, because it is possible for the predicting device to predict the destination point which the mobile body traveled along the route up to as the destination point towards which the mobile body is currently heading, even if an operator does not set a destination point by operating the operation section or the like, a destination point can be set by selecting notified destination point information, and the setting of the destination point can be made easily without any complicated operation having to be performed.

(21) In one aspect of the present invention, the destination point prediction program causes the computer to function as: when the predicting device determines at least one a portion of the route indicated by the route information and the position of the destination point indicated by the position information is present within a predetermined range of at least one of the recognized current position of the mobile body and a road which the recognized current position of the mobile body belong to, the predicting device predicts the destination point based on at least one of the route information indicating the determined route and the position information indicating the determined position as the destination point towards which the mobile body is currently heading.

According to the present invention, when the computer determines at least one a portion of the route indicated by the route information and the position of the destination point indicated by the position information is present within a predetermined range of at least one of the recognized current position and a road which the recognized current position belong to, the computer predicts the destination point based on at least one of the route information indicating the determined route and the position information indicating the determined position as the destination point towards which the mobile body is currently heading.

Accordingly, when the route along which the mobile body traveled up to a destination point that was set in the past or the position of the destination point that was set in the past is present within a predetermined range of a road which the recognized current position belong to or a current position of the mobile body, because it is possible for the predicting device to predict the destination point which the mobile body traveled along the route up to or the destination point that was set in the past as the destination point towards which the mobile body is currently heading, even if an operator does not set a destination point by operating the operation section or the like, a destination point can be set by selecting notified destination point information, the setting of the destination point can be made easily without any complicated operation having to be performed.

(22) In one aspect of the present invention, the destination point prediction program causes the computer to function as: predicting device acquires current route information about the mobile body is currently traveling based on the recognized current position of the mobile body, after the predicting device has predicted the destination point towards which the mobile body is currently heading, the predicting device makes a new prediction as to the destination point toward which the mobile body is currently heading based on the stored route information indicating the predicted destination point and the acquired current route information.

According to the present invention, after the computer has predicted the destination point towards which the mobile body is currently heading, the computer makes a new prediction as to the destination point toward which the mobile body is currently heading based on the stored route information indicating the predicted destination point and the acquired current route information.

Accordingly, because a new prediction can be made as to the destination point towards which the mobile body is currently heading based on the current route information acquired as the mobile body advances further, it is possible to narrow down the predicted destination points as the mobile body advances further, particularly when a plurality of destination points have been predicted, the predicted destination point information can be narrowed down as the mobile body moves.

(23) In one aspect of the present invention, the destination point prediction program causes the computer to function as: when at least one of a direction in which the mobile body is traveling and road information about a road along which the mobile body is traveling is altered, the predicting device makes a new prediction as to the destination point towards which the mobile body is currently heading.

According to the present invention, when at least one of a direction in which the mobile body is traveling and road information about a road along which the mobile body is traveling is altered, the computer makes a new prediction as to the destination point towards which the mobile body is currently heading.

Accordingly, because a new prediction as to the destination point can be made when the direction in which the mobile body is traveling changes or when the road information about the road which the mobile body is traveling on changes such as when the road along which the mobile body is traveling changes, if the new prediction is made from among the destination points predicted in the previous prediction, the notified destination point information can be narrowed down as the mobile body moves.

(24) In one aspect of the present invention, the destination point prediction program causes the computer to function as: the predicting device predicts the destination point present within a preset range relative to a direction in which the mobile body is traveling as the destination point towards which the mobile body is currently heading.

According to the present invention, the computer predicts the destination point present within a preset range relative to a direction in which the mobile body is traveling as the destination point towards which the mobile body is currently heading.

Accordingly, when a destination point is predicted based on the current position of the mobile body, the road which the recognized current position belong to, or the route information about a route along which the mobile body traveled up to a destination point that was set in the past, it is possible to narrow down the predicted destination points to those within a preset range relative to the direction in which the mobile body is traveling, and thereby increase the accuracy of the prediction.

(25) In one aspect of the present invention, the destination point prediction program causes the computer to function as: the predicting device predicts the destination point towards which the mobile body is currently heading using additional information that includes at least information on a date and time when the mobile body is moving as a condition for the prediction.

According to the present invention, the computer predicts the destination point towards which the mobile body is currently heading using additional information that includes at least information on a date and time when the mobile body is moving as a condition for the prediction.

Accordingly, because the destination point towards which the mobile body is currently heading can be predicted based on additional information such as the date and time, it is possible to narrow down the predicted destination points which the mobile body is traveling, and thereby increase the accuracy of the prediction.

(26) In one aspect of the present invention, the destination point prediction program causes the computer to function as: a predicting device predicts the destination point towards which the moving body is currently heading based on conditions, if the conditions for predicting the destination point are input.

According to the present invention, an input device for inputting prediction conditions when the computer is predicting the destination point towards which the mobile body is currently heading, wherein the predicting device predicts the destination point towards which the mobile body is currently heading based on the prediction conditions input using the input device.

Accordingly, because an operator is able to set conditions for predicting a destination point, the destination point towards which the mobile body is heading can be predicted based on conditions desired by the operator.

BRIEF DESCRIPTION OF THE DRAWINGS

FIG. 4 is a flow chart showing an operation to predict another destination point according to an embodiment of the present invention.

DESCRIPTION OF THE PREFERRED EMBODIMENTS

Figure 1:
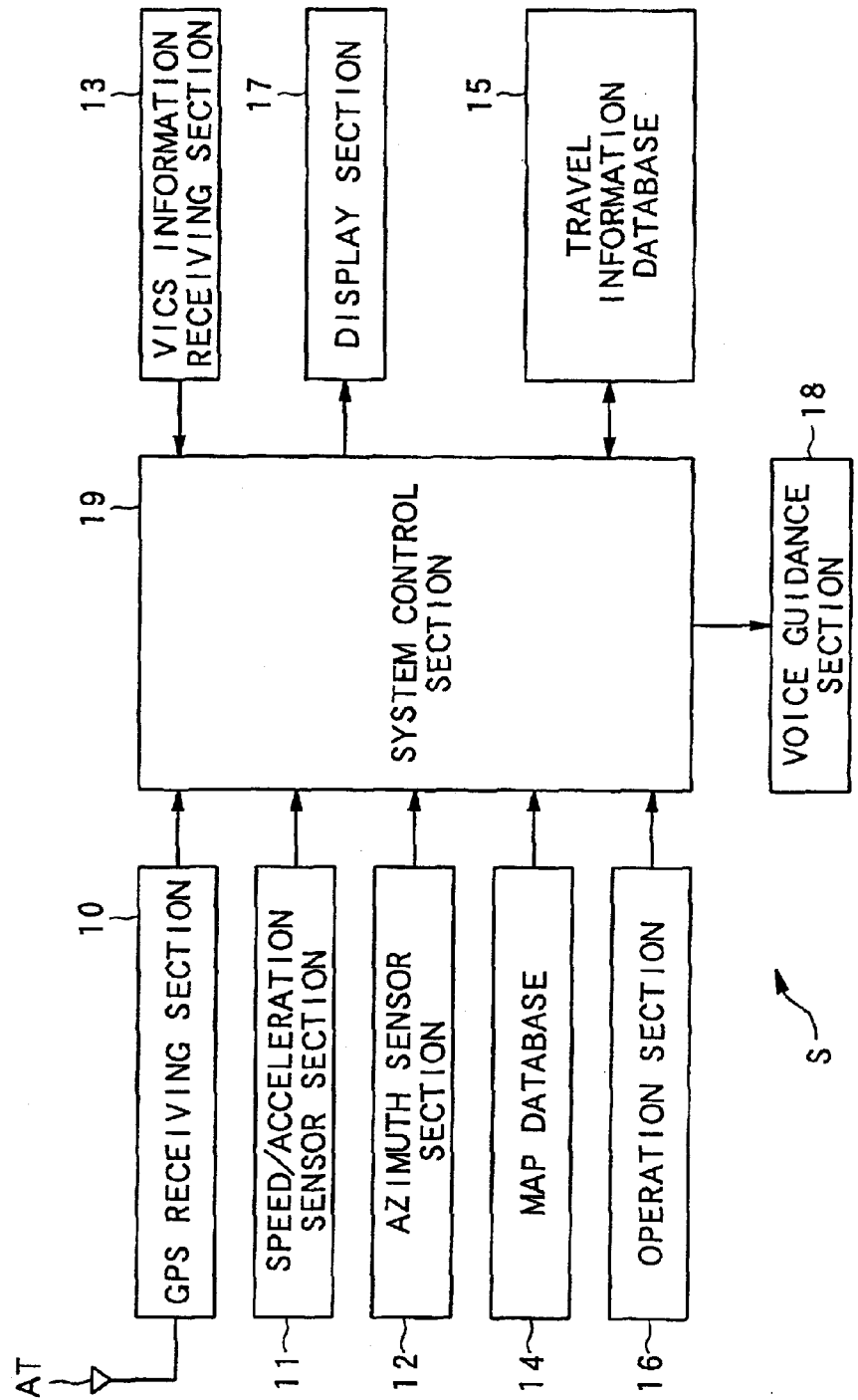
FIG. 1 is a block diagram showing the configuration of a navigation system according to an embodiment of the present invention.

The present invention will now be described with reference to preferred embodiment shown in the drawings.

The embodiment described below is an embodiment in which the present invention is applied to a navigation system that is mounted in a vehicle (this will be referred to below simply as a navigation system).

Firstly, the overall configuration of the navigation system of the present embodiment and an outline of the operation thereof will be described using FIG. 1.

Figure 2:
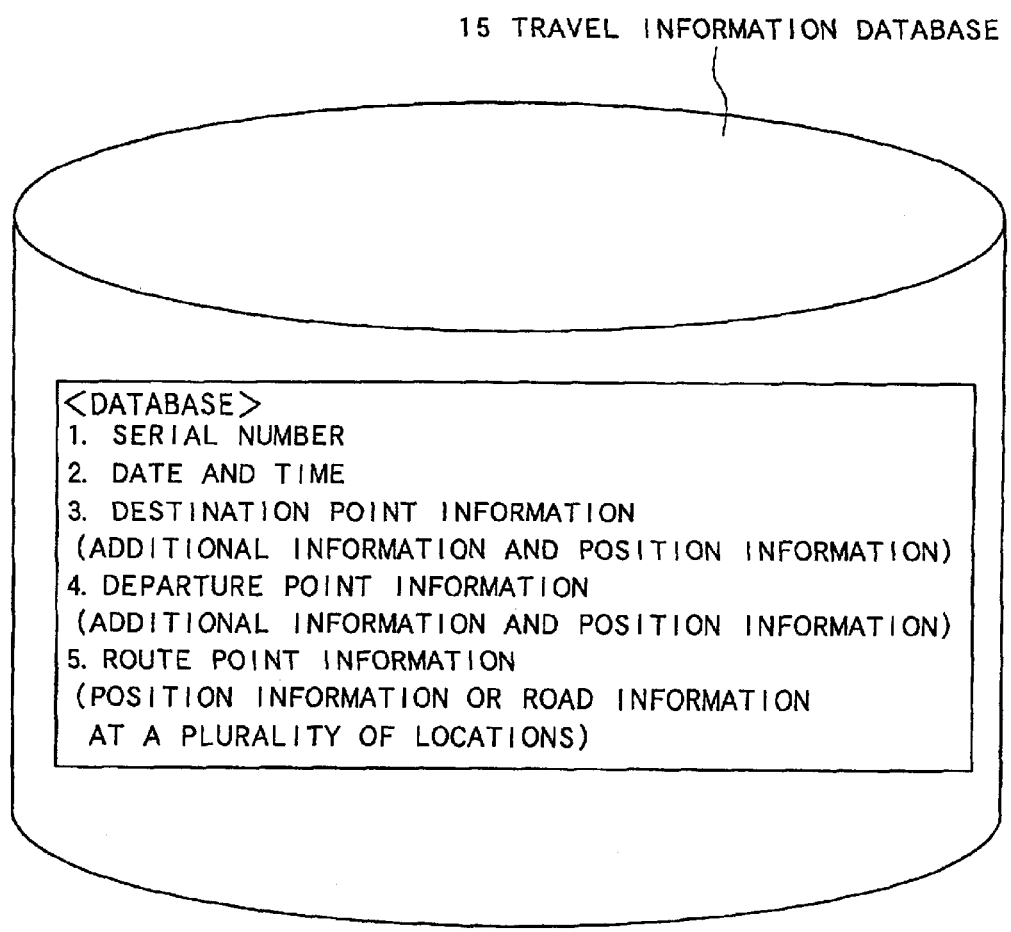
FIG. 2 is an example of a data structure recorded in the database of the travel information database according to an embodiment of the present invention.

FIG. 1 is a block diagram schematically showing the configuration of a navigation system according to the present embodiment. FIG. 2 shows the structure of data recorded in the database of the travel information database of the present embodiment.

As is shown in FIG. 1, the navigation system S according to the present embodiment is comprised of a global positioning system (GPS) receiving section 10 that is connected to an antenna AT and receives GPS data, a speed/acceleration sensor section 11 that senses the traveling speed and acceleration of a vehicle, an azimuth sensor section 12 that senses the azimuth of a vehicle, a VICS information receiving section 13 that receives VICS information, a map database 14 that stores map data, a travel information database 15 that stores information relating to the traveling of a vehicle, an operation section 16, a display section 17 that displays map data and a vehicle position, a voice guidance section 18 that outputs a voice for guiding a driver; and a system control section 19 that controls the overall system.

The GPS receiving section 10 is served as the receiving device of the present invention. The travel information database 15 is served as the database of the present invention. The display section 17 is served as the notification device of the present invention. The system control section 19 is served as the recognition device and the predicting device of the present invention. The operation section 16 is served the input device and the deciding device of the present invention.

The GPS receiving section 10 receives navigation radio waves from a plurality of artificial satellites belonging to a global positioning system via the antenna AT. The GPS receiving section 10 also calculates pseudo coordinate values for the current position and outputs these as GPS data to the system control section 19.

The speed/acceleration sensor section 11 senses the running speed of the vehicle. It then converts the detected speed into speed data having a form of pulses or voltage and outputs this speed data to the system control section 19.

The speed/acceleration sensor section 11 also senses the motion state of the vehicle in a vertical direction by comparing the gravitational acceleration with the acceleration generated by the movement of the vehicle. It then converts acceleration data showing the detected motion state into the form of pulses or voltage and outputs this acceleration data to the system control section 19.

The azimuth sensor section 12 is comprised by what is known as a gyro sensor and senses the azimuth of the vehicle, namely, the traveling direction in which the vehicle is traveling. It then converts this azimuth into azimuth data having a form of pulses or voltage and then outputs this azimuth data to the system control section 19.

The VICS information receiving section 13 acquires VICS data by receiving FM multiplex broadcast radio waves and the like. It then outputs the acquired VICS data to the system control section 19.

The map database 14 stores map data for using to guide the movement of the vehicle, such as road maps and other information needed to guide a trip. More specifically, the map database 14 is comprised by a DVD drive or the like that reads map data from a DVD-read only memory (DVD-ROM) on which the map data and the information needed to guide a trip is stored.

The travel information database 15 stores information which can be written to or read from the database 15 by control of the system control section 19. As is shown in FIG. 2, a data series that is stored on this database is made up of date and time, destination point information, departure point information, and route information such as points along the route or data of roads along the route (this will be referred to below as road identifying information).

A serial number is given to this data. The destination point information and the departure point information include position information such as the respective longitudes and latitudes, and additional information such as the name and type of the destination point.

When an operator sets the destination point and vehicle route by operating the operation section 16, the destination point, the departure point, the date and time, and the name of the destination point at the time are recorded in the travel information database 15. In addition, route information is recorded in the travel information database 15 when the vehicle is traveling along the route up to a destination point after the route up to the destination point have been set.

For example, the route information includes information about route points such as reference points are recorded by preset time intervals and traveling intervals and intersections. These route points are recorded in the travel information database 15, and road identifying information indicating route which is calculated based on the route points is recorded in the travel information database 15.

When the mobile body passes the route point, the passing date and time are recorded in the travel information database 15 as the route information, or when the mobile body passes the road, the passing date and time are recorded in the travel information database 15 as the route information. The method of recording the route points is performed based on system prescriptions.

It is also possible for the writing of data in the travel information database 15 to be performed by making recordings based on automatic recognition.

For example, a position where the engine of a vehicle is stopped is regularly recorded and when the same position is recorded a predetermined number of times, which position is recorded in the above described database as destination point information. The relevant position may also be recorded as a "frequent destination" or a "regular destination", which are described below. As a result, an operator is able to set the destination point without having to set a destination point.

Destination point information that has been recorded in this manner is used in the destination point prediction processing (described below) as destination point information that has been set in the past.

The operation section 16 is comprised of a remote control device or the like that has a variety of keys such as numerical keys and a variety of confirmation buttons and is used by an operator, for example, to input commands for setting and inputting of retrieval conditions (prediction conditions (these are described below)) and inputting of display commands to display vehicle travel information.

As is described below, when the predicted destination point is displayed on the display section 17 by the operation section 16, it is possible to perform an operation to set the displayed destination point as the current destination point.

The display section 17 displays various states as necessary such as map data read from the map database 14 and a destination point (described below) and travel guidance in the navigation system S. This display of the destination point on the display section 17 is described below.

The voice guidance section 18 outputs travel route guidance information by voice. This travel route guidance information includes information about the direction in which the vehicle travels at the next intersection and information about to be notified immediately to a driver (e.g., congestion information or closed road information).

The system control section 19 manages general functions for navigation processing in parallel with the above operations including control of the various input and output ports (e.g., the GPS reception port, key input port, and display section control port).

Based on travel information (i.e., vehicle position data and speed data) obtained from a position calculation section (not shown), the system control section 19 performs control such that the above travel route guidance information is displayed on the display section 17 on a map showing the region surrounding the vehicle and including the current position of the vehicle. The system control section 19 also performs control such that relevant travel route guidance information is output as voice from the voice guidance section 18.

When the operator has began a trip without setting a destination point, the system control section 19 displays travel information obtained from the position calculation section (not shown) on display section 17, namely, estimates the destination point based on the current position of the vehicle and the direction in which the vehicle is traveling. By selecting this predicted destination point using the operation section 16 or voice recognition section (not shown), the operator is able to set the selected destination point as the destination point of the current trip.

More specifically, the system control section 19 retrieves destination point information stored in the travel information database 15 based on position information of the vehicle, the direction in which the vehicle is traveling and information about the road along which the vehicle is moving. When a candidate for the destination point towards which vehicle is traveling exists in the retrieval results, the system control section 19 displays the candidate on display section 17 as the predicted destination point.

A description will now be given of the method of predicting the destination point in the present embodiment. In the present embodiment, two methods are used for predicting the destination point and each of these methods is described below.

In one method, road indicated by road identifying information in the travel information database 15 that matches the position of the vehicle or the road along which the vehicle is traveling recognized on the basis of the current position of the vehicle and the direction in which the vehicle is traveling is retrieved, or route points that included by the route along which the vehicle is currently moving are retrieved. If the road identifying information indicating the matched the road or the route points are retrieved, the destination point indicated by the retrieved road identifying information or the retrieved route points is displayed on the display section 17. However, in the present embodiment, the route traveled by the vehicle is determined by the system control section 19 based on information on a plurality of consecutive current positions.

In this prediction method, if information on a plurality of destination points is displayed at the start of the trip, the predicted destination point is gradually narrowed down as the vehicle advances further along the travel route. Based on the above described route information in the vehicle, the destination point is retrieved and the retrieval results are displayed.

For example, in that case information on a plurality of destination points is displayed using the above described method, if the vehicle does not pass the route points or the roads indicated the displayed destination point as the vehicle advances, the displayed destination point is removed from the candidates for information about the destination point the towards which vehicle is heading and stops being displayed on the display section 17. Namely, when the route along which vehicle is traveling does not match the route about the predicted destination point, the destination point of the route, which does not match, is removed from the list of predicted destination points.

The determination as to whether or not a vehicle has traveled past route points or roads in the destination information is performed by determining that the vehicle has not traveled past the route points or roads when the route taken by the vehicle does not match route points of a destination point for a predetermined consecutive number of times.

In the present embodiment, if the operator does not set a destination point is displayed, the display is maintained, and if one of the destination point items is removed as a candidate, then that destination point stops being displayed.

Moreover, in this method, if a portion of a road indicated by road information of the vehicle matches a portion of route indicated by road identifying information or the route point indicated by the route information that was set at a previous point in the past, the database is searched, however, if route point indicated by the route information or road indicated by the road identifying information set at a point in the past matches current position of the vehicle, it is also possible for the destination point in road identifying information indicating the matching route point or in road identifying information indicating the matching the road to be displayed on the display section 17.

By making a prediction in this manner, if a road along which the vehicle is currently traveling is one along which it has traveled at some time in the past, then it is possible to display destination points connected with that road. Even if a plurality of destination points is displayed when a vehicle first begins a trip, the number of destination point items is narrowed down as the vehicle proceeds.

In the other destination point prediction method, based on the recognized current position of the vehicle, route or destination pint indicated by the route point information or road indicated by the road identifying information in the travel information database 15 located within a preset range from the current position of the vehicle is retrieved. If the route or destination point indicated by the route point information or the road indicated by the road identifying information in the destination point information exists within a preset range from the current position of the vehicle, the located destination point, the destination point had by the route point information indicating the located route, or the destination point had by the road identifying information indicating the located road is displayed as predicted destination points on the display section 17.

As described above, in the present embodiment, two prediction methods are employed, however, in the present embodiment, one of these two prediction methods may be employed or, alternatively, a combination of both prediction methods maybe used together.

It is also possible in the destination point prediction method to limit the destination points to those having a position information of the destination point within a preset range relative to the direction in which the moving body is traveling. For example, it is possible to limit the destination points to those having a position information of the destination point contained within 45 degrees relative to the direction of travel of the vehicle when predicting the destination point. In this case, the range may be set in advance as system values, or may be set using the operation section 16 as is described below.

It is also possible to add additional information such as date and time and type. For example, when no destination point is set, even though the vehicle may be traveling in the same direction and have the same current location, the additional information of "restaurant" may be added to the prediction conditions if the vehicle is traveling during the daytime, while the additional information of "hotel" may be added to the prediction conditions if the vehicle is traveling at night. Alternatively, if the vehicle is traveling on a weekday, information about the driver's place of employment may be added to the prediction conditions, while, if the vehicle is traveling on a weekend, information about leisure facilities may be added to the prediction conditions.

Such prediction conditions in additional information may be set by an operator using the operation section 16. In addition to those given above, these prediction conditions can be limited to only those locations registered as a "frequent destination" or "regular destination", or can be limited to locations set within a short distance, or can be limited by the driver.

Results of predictions are displayed on the display section 17; however, the display method may consist of displaying relevant destination points in a list, displaying them on roads along which the vehicle is traveling, or dividing the destination point information into various types and displaying these.

The predicted destination point displayed on the display section 17 may be displayed continuously, or may be displayed at predetermined times such as when the vehicle passes an intersection, when the vehicle changes direction, or at fixed time intervals.

Figure 3:
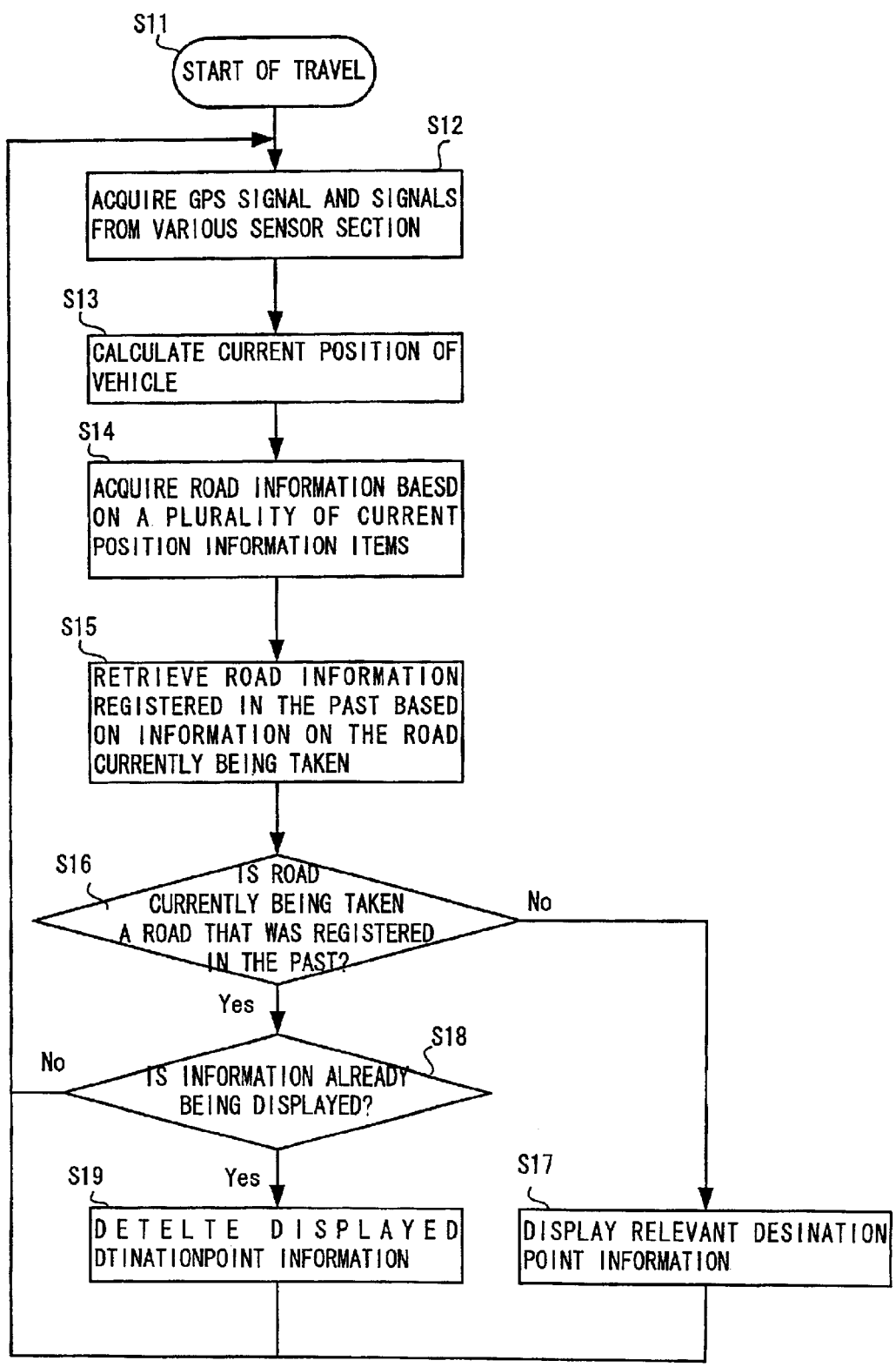
FIG. 3 is a flow chart showing an operation to predict a destination point according to an embodiment of the present invention.

The operation of the destination point prediction method executed the system control section 19 will now be described using FIGS. 3 and 4.

Firstly, the destination point prediction operation in the road information of the vehicle will be described using FIG. 3.

It should be noted that a plurality of destination point items are recorded in advance in the travel information database 15 and no search conditions are set in the additional information.

Firstly, if the vehicle begins a trip without a destination point being set (step S11), the system control section 19 obtains information outputted from the GPS receiving section 10, the speed acceleration sensor section 11, and the azimuth sensor section 12 (step S12). Based on this information, the system control section 19 makes a position calculation section (not shown) calculate the position of the vehicle and the system control section 19 determines the current position of the vehicle (step S13).

Subsequently, the system control section 19 specifies the road on which the vehicle is currently traveling based on a plurality of current position information items acquired as the vehicle advances and on map data stored in the map database 14 (step S14).

Next, based on this specified road information, the system control section 19 retrieves road identifying information or route point information that was recorded in the past and stored in the travel information database 15 (step S15).

At this time, if the destination point has already been retrieved, the destination point is retrieved from the results of the previous retrieval. Accordingly the destination point predicted from the route of the vehicle is narrowed down. Furthermore, if additional information and prediction conditions such as the direction in which the vehicle is traveling have been set, then the retrieval is executed based on the relevant prediction conditions.

Next, the system control section 19 makes decision whether or not there is any road identifying information or route point information in the destination point information that matches the road information of the vehicle (step S16). If there is such matching information, the system control section 19 displays the destination point for the recorded road information or route point information on the display section 17 (step S17).

If there is no such matching information, the system control section 19 makes decision whether or not any destination point is already displayed (step S 18). If no destination point is displayed on the display section 17, the routine returns to step S12. If the destination point is already being displayed, the destination point is deleted and is no longer displayed. The routine then returns to step S12 (step S19). However, the system control section 19 executes the processing of step S19 when it makes the display of the relevant map destination terminate, for example, it counts the number of non-matching routine processing for the road on which the vehicle is currently traveling and it determines that the number of non-matches has reached a previously determined number.

If a destination point to which the vehicle is currently heading is decided using the operation section 16 from displayed the destination point when the destination point is displayed on the display section 17, the system control section 19 ends the present operation. It is also possible instead of the operation using the operation section 16 to decide the destination point by voice recognition using a voice recognition section (not shown).

Moreover, in the present operation, processing is performed based on roads currently being traveled on by a vehicle, however, when the prediction is made using the vehicle position without the road currently being traveled on by the vehicle being specified, the routine moves from step S13 to step S15 and the destination point is retrieved based on position information of the vehicle.

Next, the prediction operation to retrieve destination points existing within a predetermined range based on the current position will be described using FIG. 4.

It should be noted that a plurality of destination point items are recorded in advance in the travel information database 15 and no search conditions are set in the additional information.

Firstly, if the vehicle begins a trip without a destination point being set (step S21), the system control section 19 obtains information outputted from the GPS receiving section 10, the speed acceleration sensor section 11, and the azimuth sensor section 12 (step S22). Based on this information, the system control section 19 makes a position calculation section (not shown) calculate the position of the vehicle and the system control section 19 determines the current position of the vehicle (step S23).

Subsequently, based on information on where the vehicle is currently traveling, the system control section 19 retrieves road information or route information that was recorded in the past and stored in the travel information database 15 (step S24).

At this time, if additional information and prediction conditions such as information about the direction in which the vehicle is traveling have been set, then the retrieval is performed based on these prediction conditions.

Next, the system control section 19 makes decision whether or not position information of the destination point exists within a preset range in the position information (step S25). If no position information of the destination point exists within a preset range in the position information, the system control section 19 executes the processing of step S22. If position information of the destination point does exist within a preset range in the position information, the system control section 19 displays position information of the destination point for the recorded road information or route point information on the display section 17 and the routine return to step S22 (step S26).

It should be noted that, in the present operation, the destination point is retrieved based on position information of the destination point, however, the destination point can also be retrieved based on road identifying information.

In this case, if the destination point is retrieved from the results of the previous retrieval when a previous retrieval has already been made, the predicted destination point is narrowed down as the vehicle advances.

As described above, according to the present embodiment, because the system control section 19 is able to acquire information about the road which a vehicle is traveling along based on calculated vehicle position information, if the information about the road which the vehicle is traveling along matches route points and road identifying information in destination point information that was set in the past, destination points in the route points or road identifying information can be predicted as the destination point of the vehicle. Moreover, when a prediction is being made, if this prediction is made from previously predicted destination point, the destination points can be narrowed down as the vehicle advances, and the predicted destination points can be displayed using the display section 17.

Accordingly, because it is possible for destination point to be displayed based on vehicle position information even if an operator does not set a destination point by operating the operation section 16 or the like, a destination point can be set by selecting a displayed destination point, the setting of the destination point can be made easily without any complicated operation having to be performed.

As a result, because a travel route can be retrieved with VICS information taken into consideration, it is possible to guide a vehicle to a regular destination not by the regularly taken route but using a route that has been influenced by the VICS information.

Moreover, when a destination point that was set at some time in the past exists within a preset range around the current position of the vehicle, because the system control section 19 can predict this destination point to be the destination point of the vehicle and can display this predicted destination point on the display section 17, in the manner described above, it is possible for destination point on to be displayed based on vehicle position information even if an operator does not set a destination point by operating the operation section 16 or the like. Accordingly, a destination point can be set by selecting a displayed destination point, the setting of the destination point can be made easily without any complicated operation having to be performed.

As a result, because it is possible, in the manner described above, to retrieve a travel route based on VICS information or the like, it is possible to guide a vehicle to a regular destination not by the regularly taken route but using a route that has been influenced by the VICS information.

Moreover, because a prediction can be made based on the direction in which the vehicle is moving and additional information such as the date and time the vehicle is traveling, the destination point can be predicted with a higher degree of accuracy, namely, with a higher degree of probability.

In the present embodiment, the predicted destination point is made known to an operator by being displayed using the display section 17, however, this destination point may also be made known using the voice guidance section 18. As a result, by setting the relevant destination point by voice recognition using a voice recognition section (not shown) instead of the operation section 16, an operator can set a destination point while still driving a vehicle without the driving being hindered in any way.

In the method of predicting destination point using road identifying information or route point information recorded in the travel information database 15 of the present embodiment, the prediction operation performed in the system control section 19 is processed as a routine at predetermined time intervals after the vehicle has begun traveling. However, in the case of information that is displayed while the vehicle changes its direction of travel or when the road the vehicle is traveling on changes such as when it goes through an intersection, it is also possible for a search to again be made of the travel information database 15 and data for route points or road identifying information that no longer match to be removed from the predicted destination points and the display thereof on the display section 17 to be ended. In this case as well, it is possible for the displayed the destination point to be narrowed down as the vehicle progresses.

In the present embodiment, the operation to predict a destination point is performed by the system control section 19, however, it is also possible to record a program for executing the prediction processing onto a recording medium and for the prediction processing to be executed as a result of the program stored on the recording medium being read by a computer.

In this case, the system control section 19 is provided with a computer for read executing this program. As a result, the same effects as those of the above described navigation system can be obtained.

Moreover, the above described processing for the prediction operation that was performed by the system control section 19 can also be performed by a fixed installation server system that is provided in an optional location.

In this case, a transmission section for transmitting the respective items of information acquired by the GPS receiving section 10, the speed/acceleration sensor section 11, and the azimuth sensor section 12 to the server can be provided in the navigation system S, together with a receiving section for receiving data predicted by the server, thereby constructing a navigation system for performing the above prediction operation using the navigation system and the server. Destination point information that was set in the past such as route points and road identifying information is recorded as data for each navigation system in a recording section provided at the server side. As a result, the same effects as in the above described navigation system can be obtained.

Moreover, in the present embodiment, the prediction processing is performed by a navigation system mounted in a vehicle, however, it is also possible for the prediction processing to be performed by a portable terminal system such as a mobile telephone.

In this case, the above described prediction processing is performed by recognizing the position of the portable terminal system based on communication radio waves used for communication between the portable terminal system and a base station. Guidance to a destination point is given by displaying a predicted destination point on the portable terminal system. The destination point prediction processing may be performed by the portable terminal system or may be performed by a server provided in a base station or the like.

Therefore, even if an operator does not set a destination point by operating the operation section or the like, a destination point can be set by selecting notified destination point information, the setting of the destination point can be made easily without any complicated operation having to be performed.

The entire disclosure of Japanese Patent Application No. 2001-132896 filed on Apr. 27, 2001 including the specification, claims, drawings and summary is incorporated herein by reference in its entirety.

What is claimed is:

1. A navigation system comprising:

a receiving device which receives current position information used for measuring a current position of a mobile body;

a recognizing device which recognizes the current position of the mobile body based on the received current position information;

a database which stores destination point information including at least one of position information about a position of a destination point that was set in the past and route information about a route along which the mobile body traveled up to a destination point that was set in the past;

a predicting device which predicts a destination point towards which the mobile body is currently heading based on the recognized current position of the mobile body and the destination point information stored in the database; and a notifying device which gives notification of the destination point towards which the mobile body is currently heading that has been predicted by the predicting device.

wherein:

the predicting device predicts the destination point towards which the mobile body is currently heading using additional information that includes at least information on a date and time when the mobile body is moving as a condition for the prediction.

2. The navigation system according to claim 1, wherein:
when the predicting device determines a portion of the route indicated by the route information matches at least one of the recognized current position of the mobile body and a road which the recognized current position of the mobile body belong to,
the predicting device predicts the destination point based on the route information indicating the determined route as the destination point towards which the mobile body is currently heading.

3. The navigation system according to claim 1, wherein:
when the predicting device determines at least one a portion of the route indicated by the route information and the position of the destination point indicated by the position information is present within a predetermined range of at least one of the recognized current position of the mobile body and a road which the recognized current position of the mobile body belong to,
the predicting device predicts the destination point based on at least one of the route information indicating the determined route and the position information indicating the determined position as the destination point towards which the mobile body is currently heading.

4. The navigation system according to claim 1, wherein:
predicting device acquires current route information about the mobile body is currently traveling based on the recognized current position of the mobile body,
after the predicting device has predicted the destination point towards which the mobile body is currently heading,
the predicting device makes a new prediction as to the destination point toward which the mobile body is currently heading based on the stored route information indicating the predicted destination point and the acquired current route information.

5. The navigation system according to claim 1, wherein:
when at least one of a direction in which the mobile body is traveling and road information about a road along which the mobile body is traveling is altered,
the predicting device makes a new prediction as to the destination point towards which the mobile body is currently heading.

6. The navigation system according to claim 1, wherein:
the predicting device predicts the destination point present within a preset range relative to a direction in which the mobile body is traveling as the destination point towards which the mobile body is currently heading.

7. The navigation system according to claim 1, further comprising:
an input device which inputs prediction conditions when the predicting device predicts the destination point towards which the mobile body is currently heading,
wherein the predicting device predicts the destination point towards which the mobile body is currently heading based on the prediction conditions input using the input device.

8. The navigation system according to claim 1, further comprising;
a deciding device which decides that the destination point predicted by the predicting device is the destination point towards which the mobile body is heading,
wherein after the destination point has been decided by the deciding device, the prediction processing by the predicting device to predict a destination point is ended.

9. A server system for a navigation system comprising;
a receiving device which receives current position information about a current position of a terminal device mounted in a mobile body:
a predicting device which predicts a destination point towards which the moving body is currently heading based on the current position information and destination point information including at least one of position information about a position of a destination point that was set in the past and route information about a route along which the mobile body traveled up to a destination point that was set in the past; and
a transmitting device which transmits to the terminal device information about the destination point towards which the moving is currently heading predicted by the predicting device.
wherein:
the predicting device predicts the destination point towards which the mobile body is currently heading using additional information that includes at least information on a date and time when the mobile body is moving as a condition for the prediction.

10. The server system for a navigation system according to claim 9, wherein:
when the predicting device determines a portion of the route indicated by the route information matches at least one of the recognized current position of the mobile body and a road which the recognized current position of the mobile body belong to,
the predicting device predicts the destination point based on the route information indicating the determined route as the destination point towards which the mobile body is currently heading.

11. The server system for a navigation system according to claim 9, wherein:
when the predicting device determines at least one a portion of the route indicated by the route information and the position of the destination point indicated by the position information is present within a predetermined range of at least one of the recognized current position of the mobile body and a road which the recognized current position of the mobile body belong to,
the predicting device predicts the destination point based on at least one of the route information indicating the determined route and the position information indicating the determined position as the destination point towards which the mobile body is currently heading.

12. The server system for a navigation system according to claim 9, wherein:
the predicting device acquires current route information about the mobile body is currently traveling based on the recognized current position of the mobile body,
after the predicting device has predicted the destination point towards which the mobile body is currently heading,
the predicting device makes a new prediction as to the destination point toward which the mobile body is currently heading based on the stored route information indicating the predicted destination point and the acquired current route information.

13. The server system for a navigation system according to claims 9, wherein:
when at least one of a direction in which the mobile body is traveling and road information about a road along which the mobile body is traveling is altered, the predicting device makes a new prediction as to the destination point towards which the mobile body is currently heading.

14. The server system for a navigation system according to claim 9, wherein:
the predicting device predicts the destination point present within a preset range relative to a direction in which the mobile body is traveling as the destination point towards which the mobile body is currently heading.

15. The server system for a navigation system according to claim 9, wherein:
the receiving device receives notification that prediction conditions for predicting the destination point towards which the mobile body is currently heading have been input into the terminal device, and
the predicting device predicts the destination point towards which the mobile body is currently heading based on the received prediction conditions.

16. The server system for a navigation system according to claim 9, wherein:
the predicting device puts an end to predict the destination point when the receiving device receives notification that the destination point has been decided by the terminal device.

17. An information recorded medium wherein a destination point prediction program is recorded so as to be read by a computer, the computer included in a navigation system for navigating a mobile body, the program causing the computer to function as:
a predicting device which predicts a destination point information towards which the mobile body is currently heading based on a recognized current position of the mobile body and destination point information including at least one of position information about a position of a destination point that was set in the past and route information about a route alone which the mobile body traveled up to a destination point that was set in the past; and
a notifying device which gives notification of the destination point towards which the mobile body is currently heading that has been predicted by the predicting device.
wherein the program further causes the computer to function as:
the predicting device predicts the destination point towards which the mobile body is currently heading using additional information that includes at least information on a date and time when the mobile body is moving as a condition for the prediction.

18. The information recorded medium according to claim 17, wherein the program further causes the computer to function as:
when the predicting device determines a portion of the route indicated by the route information matches at least one of the recognized current position of the mobile body and a road which the recognized current position of the mobile body belong to,
the predicting device predicts the destination point based on the route information indicating the determined route as the destination point towards which the mobile body is currently heading.

19. The information recorded medium according to claim 17, wherein the program further causes the computer to function as:
when the predicting device determines at least one a portion of the route indicated by the route information and the position of the destination point indicated by the position information is present within a predetermined range of at least one of the recognized current position of the mobile body and a road which the recognized current position of the mobile body belong to,
the predicting device predicts the destination point based on at least one of the route information indicating the determined route and the position information indicating the determined position as the destination point towards which the mobile body is currently heading.

20. The information recorded medium according to claim 17, wherein the program further causes the computer to function as:
predicting device acquires current route information about the mobile body is currently traveling based on the recognized current position of the mobile body,
after the predicting device has predicted the destination point towards which the mobile body is currently heading,
the predicting device makes a new prediction as to the destination point toward which the mobile body is currently heading based on the stored route information indicating the predicted destination point and the acquired current route information.

21. The information recorded medium according to claim 17, wherein the program further causes the computer to function as:
when at least one of a direction in which the mobile body is traveling and road information about a road along which the mobile body is traveling is altered,
the predicting device makes a new prediction as to the destination point towards which the mobile body is currently heading.

22. The information recorded medium according to claim 17, wherein the program further causes the computer to function as:
the predicting device predicts the destination point present within a preset range relative to a direction in which the mobile body is traveling as the destination point towards which the mobile body is currently heading.

23. The information recorded medium according to claim 17,
wherein the program further causes the computer to function as: a predicting device predicts the destination point towards which the moving body is currently heading based on conditions, if the conditions for predicting the destination point are input.

24. A navigation system, comprising a control circuit that recognizes a current position of a mobile body, and
a memory that stores past route information leading to a past destination point to which the mobile body traveled in the past.
wherein the control circuit predicts a new destination point based on at least a portion of the past route information.
wherein the control circuit predicts the new destination point based on at least one of a current date and time.

25. The system as claimed in claim 24, wherein the past route information includes at least one of (1) route points on a route that the mobile body traveled in the past and (2) road identifying information about a road that the mobile body traveled in the past, and
wherein the control circuit predicts the new destination point based on at least one of the route points and the road identifying information.

26. The system as claimed in claim 25, wherein the control circuit predicts the new destination point based on at least one of the recognized current position of the mobile body and a road corresponding to the recognized current position.

27. The system as claimed in claim 24, wherein the control circuit predicts the new destination point based on a current traveling direction of the mobile body.

28. The system as claimed in claim 24, wherein the control circuit predicts the new destination point based on a current traveling direction of the mobile body.

29. A navigation system, comprising a control circuit that recognizes a current position of a mobile body, and a memory that stores information about a past destination point to which the mobile body traveled in the past, wherein the control circuit predicts a new destination point based on at least the past destination point.

wherein the control circuit predicts the new destination point based on at least one of a current date and time.

30. The system as claimed in claim 29, wherein the control circuit predicts the new destination point based on at least one of the recognized current position of the mobile body and a road corresponding to the recognized current position.

31. The system as claimed in claim 29, wherein the control circuit predicts the new destination point based on a current traveling direction of the mobile body.

* * * * *

(12) INTER PARTES REEXAMINATION CERTIFICATE (655th)
United States Patent
Yano et al.

(10) Number: US 6,941,222 C1
(45) Certificate Issued: Jul. 29, 2013

(54) NAVIGATION SYSTEM, SERVER SYSTEM FOR A NAVIGATION SYSTEM, AND COMPUTER-READABLE INFORMATION RECORDED MEDIUM IN WHICH DESTINATION PREDICTION PROGRAM IS RECORDED

(75) Inventors: Kenichiro Yano, Tsurugashima (JP); Kiyonori Myochin, Tokyo-to (JP); Keiichi Yamauchi, Tsurugashima (JP)

(73) Assignee: Pioneer Corporation, Meguro-ku, Tokyo-to (JP)

Reexamination Request:
No. 95/001,335, Apr. 19, 2010

Reexamination Certificate for:
Patent No.: 6,941,222
Issued: Sep. 6, 2005
Appl. No.: 10/132,570
Filed: Apr. 26, 2002

(30) Foreign Application Priority Data

Apr. 27, 2001 (JP) ................ P2001-132896

(51) Int. Cl.
*G01C 21/34* (2006.01)
*G08G 1/0968* (2006.01)

(52) U.S. Cl.
USPC ........ 701/420; 701/424; 701/522; 340/995.1; 340/995.17; 340/995.18; 342/359

(58) Field of Classification Search
None
See application file for complete search history.

(56) References Cited

To view the complete listing of prior art documents cited during the proceeding for Reexamination Control Number 95/001,335, please refer to the USPTO's public Patent Application Information Retrieval (PAIR) system under the Display References tab.

*Primary Examiner* — Zoila Cabrera

(57) ABSTRACT

A navigation system is provided that allows an appropriate destination point to be set when a vehicle begins to travel without an operator setting a destination point. A navigation system is provided with a system control section and, if a vehicle begins to travel without an operator setting a destination point, destination point information is retrieved. This destination point information is stored in a travel information database on the basis of information about the position of the vehicle, the direction in which the vehicle is progressing and information about the road. The road is which the vehicle is traveling along that was calculated based on the respective signals input from a GPS receiving section and various sensor sections. In addition, if there are candidates fur the relevant destination point, candidate destination points are displayed on a display section as predicted destination points.

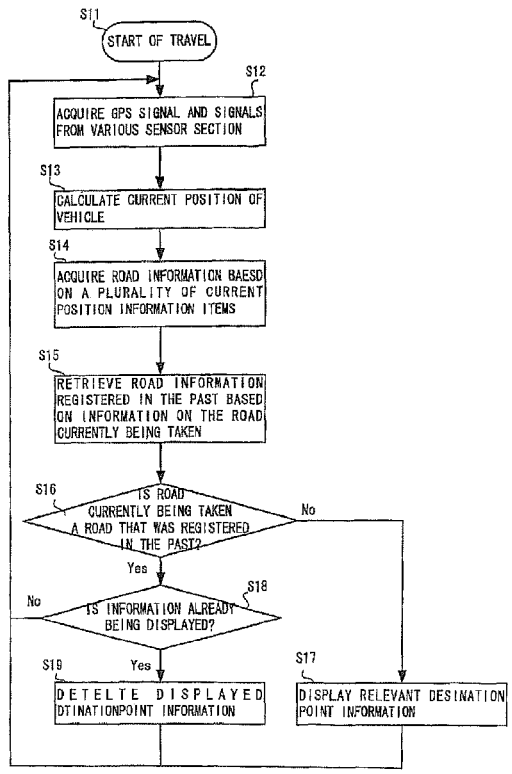

US 6,941,222 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 17 are cancelled.

Claims 2-8, 18-24 and 29 are determined to be patentable as amended.

Claims 25-28 and 30-31, dependent on an amended claim, are determined to be patentable.

Claims 9-16 were not reexamined.

2. [The navigation system according to claim 1,] *A navigation system comprising:*
  *a receiving device which receives current position information used for measuring a current position of a mobile body;*
  *a recognizing device which recognizes the current position of the mobile body based on the received current position information;*
  *a database which stores destination point information including at least one of position information about a position of a destination point that was set in the past and route information about a route along which the mobile body traveled up to a destination point that was set in the past;*
  *a predicting device which predicts a destination point towards which the mobile body is currently heading based on the recognized current position of the mobile body and the destination point information stored in the database; and*
  *a notifying device which gives notification of the destination point towards which the mobile body is currently heading that has been predicted by the predicting device;*
  *wherein:*
  *the predicting device predicts the destination point towards which the mobile body is currently heading using additional information that includes at least information on a date and time when the mobile body is moving as a condition for the prediction; and*
  wherein:
  when the predicting device determines a portion of the route indicated by the route information matches at least one of the recognized current position of the mobile body and a road which the recognized current position of the mobile body belong to,
  the predicting device predicts the destination point based on the route information indicating the determined route as the destination point towards which the mobile body is currently heading.

3. The navigation system according to [claim 1] *claim 2*, wherein:
  when the predicting device determines at least one a portion of the route indicated by the route information and the position of the destination point indicated by the position information is present within a predetermined range of at least one of the recognized current position of the mobile body and a road which the recognized current position of the mobile body belong to,
  the predicting device predicts the destination point based on at least one of the route information indicating the determined route and the position information indicating the determined position as the destination point towards which the mobile body is currently heading.

4. The navigation system according to [claim 1] *claim 2*, wherein:
  predicting device acquires current route information about the mobile body is currently traveling based on the recognized current position of the mobile body,
  after the predicting device has predicted the destination point towards which the mobile body is currently heading,
  the predicting device makes a new prediction as to the destination point toward which the mobile body is currently heading based on the stored route information indicating the predicted destination point and the acquired current route information.

5. The navigation system according to [claim 1] *claim 2*, wherein:
  when at least one of a direction in which the mobile body is traveling and road information about a road along which the mobile body is traveling is altered,
  the predicting device makes a new prediction as to the destination point towards which the mobile body is currently heading.

6. The navigation system according to [claim 1] *claim 2*, wherein:
  the predicting device predicts the destination point present within a preset range relative to a direction in which the mobile body is traveling as the destination point towards which the mobile body is currently heading.

7. The navigation system according to [claim 1] *claim 2*, further comprising:
  an input device which inputs prediction conditions when the predicting device predicts the destination point towards which the mobile body is currently heading,
  wherein the predicting device predicts the destination point towards which the mobile body is currently heading based on the prediction conditions input using the input device.

8. The navigation system according to [claim 1] *claim 2*, further comprising; a deciding device which decides that the destination point predicted by the predicting device is the destination point towards which the mobile body is heading, wherein after the destination point has been decided by the deciding device, the prediction processing by the predicting device to predict a destination point is ended.

18. [The information recorded medium according to claim 17,] *An information recorded medium wherein a destination point prediction program is recorded so as to be read by a computer, the computer included in a navigation system for navigating a mobile body, the program causing the computer to function as:*
  *a predicting device which predicts a destination point information towards which the mobile body is currently heading based on a recognized current position of the mobile body and destination point information including at least one of position information about a position of a destination point that was set in the past and route information about a route alone which the mobile body traveled up to a destination point that was set in the past; and* a notifying device which gives notification of the destination point towards which the mobile body is currently heading that has been predicted by the predicting device;

wherein the program further causes the computer to function as:

the predicting device predicts the destination point towards which the mobile body is currently heading using additional information that includes at least information on a date and time when the mobile body is moving as a condition for the prediction; and wherein the program further causes the computer to function as:

when the predicting device determines a portion of the route indicated by the route information matches at least one of the recognized current position of the mobile body and a road which the recognized current position of the mobile body belong to, the predicting device predicts the destination point based on the route information indicating the determined route as the destination point towards which the mobile body is currently heading.

19. The information recorded medium according to [claim 17] *claim 18*, wherein the program further causes the computer to function as:

when the predicting device determines at least one a portion of the route indicated by the route information and the position of the destination point indicated by the position information is present within a predetermined range of at least one of the recognized current position of the mobile body and a road which the recognized current position of the mobile body belong to, the predicting device predicts the destination point based on at least one of the route information indicating the determined route and the position information indicating the determined position as the destination point towards which the mobile body is currently heading.

20. The information recorded medium according to [claim 17] *claim 18*, wherein the program further causes the computer to function as:

predicting device acquires current route information about the mobile body is currently traveling based on the recognized current position of the mobile body, after the predicting device has predicted the destination point towards which the mobile body is currently heading, the predicting device makes a new prediction as to the destination point toward which the mobile body is currently heading based on the stored route information indicating the predicted destination point and the acquired current route information.

21. The information recorded medium according to [claim 17] *claim 18*, wherein the program further causes the computer to function as:

when at least one of a direction in which the mobile body is traveling and road information about a road along which the mobile body is traveling is altered, the predicting device makes a new prediction as to the destination point towards which the mobile body is currently heading.

22. The information recorded medium according to [claim 17] *claim 18*, wherein the program further causes the computer to function as:

the predicting device predicts the destination point present within a preset range relative to a direction in which the mobile body is traveling as the destination point towards which the mobile body is currently heading.

23. The information recorded medium according to [claim 17] *claim 18*, wherein the program further causes the computer to function as:

a predicting device predicts the destination point towards which the moving body is currently heading based on conditions, if the conditions for predicting the destination point are input.

24. A navigation system, comprising a control circuit that recognizes a current position of a mobile body, and a memory that stores past route information leading to a past destination point to which the mobile body traveled in the past;

wherein the control circuit predicts a new destination point based on at least a portion of the past route information;

wherein the control circuit predicts the new destination point based on at least one of a current date and time; *and*

*wherein when the control circuit determines a portion of the route indicated by the route information matches at least one of the recognized current position of the mobile body and a road which the recognized current position of the mobile body belong to,*

*the control circuit predicts the destination point based on the route information indicating the determined route as the destination point towards which the mobile body is currently heading.*

29. A navigation system, comprising a control circuit that recognizes a current position of a mobile body, and a memory that stores information about a past destination point to which the mobile body traveled in the past, wherein the control circuit predicts a new destination point based on at least the past destination point, wherein the control circuit predicts the new destination point based on at least one of a current date and time; *and*

*wherein when the control circuit determines a portion of the route indicated by the route information matches at least one of the recognized current position of the mobile body and a road which the recognized current position of the mobile body belong to,*

*the control circuit predicts the destination point based on the route information indicating the determined route as the destination point towards which the mobile body is currently heading.*

\* \* \* \* \*